US007885258B2

(12) United States Patent
Joo et al.

(10) Patent No.: US 7,885,258 B2
(45) Date of Patent: Feb. 8, 2011

(54) PACKET SWITCH EQUIPMENT AND BANDWIDTH CONTROL METHOD USING THE SAME

(75) Inventors: Min-Kyu Joo, Suwon-si (KR); Hoon-Jae Kim, Seoul (KR); Han-Seung Park, Seoul (KR); Seong-Ha Kim, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 751 days.

(21) Appl. No.: 11/637,339

(22) Filed: Dec. 12, 2006

(65) Prior Publication Data

US 2008/0002685 A1  Jan. 3, 2008

(30) Foreign Application Priority Data

Jun. 30, 2006  (KR) .................... 10-2006-0061099

(51) Int. Cl.
  *H04L 12/56* (2006.01)
(52) U.S. Cl. ...................... 370/389; 370/392
(58) Field of Classification Search ............. 370/230, 370/230.1, 231, 235, 252, 389, 392, 400, 370/401, 468; 709/224, 225, 229, 232, 233
  See application file for complete search history.

(56) References Cited

U.S. PATENT DOCUMENTS

| | | | |
|---|---|---|---|
| 5,485,455 A * | 1/1996 | Dobbins et al. ............. 370/255 |
| 5,521,910 A * | 5/1996 | Matthews .................... 370/256 |
| 5,790,546 A * | 8/1998 | Dobbins et al. ............. 370/400 |
| 5,867,483 A * | 2/1999 | Ennis et al. .................. 370/252 |
| 6,272,131 B1 * | 8/2001 | Ofek .......................... 370/389 |
| 6,920,112 B1 * | 7/2005 | McCloghrie et al. ........ 370/252 |
| 7,027,394 B2 * | 4/2006 | Gupta et al. ............. 370/230.1 |
| 7,103,008 B2 * | 9/2006 | Greenblat et al. ............ 370/258 |
| 2002/0075814 A1 * | 6/2002 | Desai et al. .................. 370/255 |
| 2002/0075875 A1 * | 6/2002 | Dravida et al. ......... 370/395.21 |
| 2002/0101820 A1 * | 8/2002 | Gupta et al. ................. 370/229 |
| 2002/0105965 A1 * | 8/2002 | Dravida et al. .............. 370/463 |
| 2003/0169764 A1 * | 9/2003 | Lavigne et al. .............. 370/463 |
| 2003/0172257 A1 * | 9/2003 | Greenblat et al. ........... 712/234 |
| 2005/0047424 A1 * | 3/2005 | Hutchinson et al. ......... 370/401 |
| 2006/0114912 A1 * | 6/2006 | Kwan et al. ............... 370/395.4 |

FOREIGN PATENT DOCUMENTS

KR  2004-2695  1/2004

* cited by examiner

*Primary Examiner*—Pankaj Kumar
*Assistant Examiner*—Duc T Duong
(74) *Attorney, Agent, or Firm*—Cha & Reiter, LLC

(57) ABSTRACT

Disclosed is a packet switch equipment and a band control method using same. In accordance with one embodiment of the invention, a number of packets are sampled by using a packet sampling function provided by a packet switch chip, and the sampled packets are transmitted to a CPU. By using the transmitted sample packets, the total amount of bandwidth used by a corresponding user is estimated based on the source MAC address or the source IP address. If the estimated value exceeds a predetermined threshold, a bandwidth limitation function is applied to the user that is providing packets that exceed the bandwidth. A number of users can be dynamically recognized even when they are undefined, and a dynamic bandwidth limitation function is performed by tracking the bandwidth used by a corresponding user.

16 Claims, 4 Drawing Sheets

PACKET SWITCH EQUIPMENT AND BANDWIDTH CONTROL METHOD USING THE SAME

CLAIM OF PRIORITY

This application claims the benefit of the earlier filing date, pursuant to 35 USC 119, to that patent application entitled "Packet Switch Equipment and Bandwidth Control Method Using the Same" filed with the Korean Intellectual Property Office on Jun. 30, 2006 and assigned Serial No. 2006-61099, the contents of which are incorporated herein by reference.

BACKGROUND OF THE INVENTION

1. Field of the Invention

The present invention relates to packet-based networks (e.g. Ethernet), and more particularly to a packet switch equipment based on a packet switch chip and a bandwidth control method using the same.

2. Description of the Related Art

Network switch devices based on a packet switch chip provide a port-based bandwidth limitation function by using functionalities provided by their own chip. The bandwidth limitation function provided by the packet switch chip enable users to set up a series control conditions regarding bandwidth limitation of the chip. Based on its hardware, the packet switch chip limits the use of packets that belong to a predetermined category up to a threshold in a specific scheme. It is to be noted that a user or operator must set up information regarding which category of packets are to be limited, i.e. a filtering criterion for determining packets to be subjected to bandwidth limitation, and information regarding the degree of bandwidth allowance, i.e. metering criterion, onto the packet switch chip.

Packet switch equipments also have a function of limiting the bandwidth based on all packets drawn in via a specific port. However, this function fails if a number of users are connected to a single port.

FIG. 1 is a block diagram showing the construction of a conventional packet switch equipment. Referring to FIG. 1, the packet switch equipment 10 has a packet switch chip 12 including a number of ports (e.g. eight) PORT 1 to PORT N. Each port is connectable to a number of subscriber terminals 40. In FIG. 1, the second port, PORT 2, is shown to be connected to a number of subscriber terminals 40 via a subscriber distribution device 42. The packet switch equipment 10 also has a memory 16 for storing information regarding control of packets and ports via the packet switch chip 12, a CPU 14 for controlling the overall switching operation of an Ethernet switch equipment 10 including the packet switch chip 12, and a communication channel 18 for communication with an operator terminal 30.

In the illustrated packet switch equipment 10 shown in FIG. 1, a number of subscriber terminals 40 are connected to a port, e.g., PORT 2. In order to prevent any device from exceeding a known limit, e.g., 5000 PPS (Packet Per Second), based on the source MAC (Media Access Control) address of each subscriber terminal 40, the operator must set up every source MAC address, connected to the port (PORT 2) in a manner that the source does not exceed the known limit.

However, when the conventional packet switch chip 12 is used to limit the bandwidth with regard to a number of users, the following problems occur.

First, in order to transmit packets from a number of users to a single port and prevent a specific user from using more than a predetermined amount of bandwidth or more, information regarding every subscriber connectable to the port needs to be set up. This is substantially impossible. In other words, when the amount of bandwidth used by specific source MAC is limited, based on the source MAC, with regard to packets flowing into the port, no setup regarding every MAC connectable to the second port can be made in advance.

Second, even when users connectable to a port have been determined in advance, the operator must manually set up information regarding the users onto the chip. The operator must also intervene when users are added or deleted.

Third, even when the number of users connectable to a port is limited and setups regarding them can be made, some portions of the bandwidth may not be used although they are available. For example, assuming that the total PPS which can be processed by a port is 10,000 and 10 users can use the bandwidth up to 1000 PPS, respectively, each user cannot transmit packets greater than 1000 PPS even when other users are not currently using the bandwidth. This is a waste of bandwidth.

SUMMARY OF THE INVENTION

Accordingly, the present invention has been made to solve the above-mentioned problems occurring in the prior art and provides additional advantages, by providing a packet switch equipment capable of allocating a bandwidth to a number of users dynamically, without the operator's intervention or according to default setups, when a bandwidth limitation function of a packet switch chip is utilized in a network switch equipment based on a packet switch chip, as well as a bandwidth control method using the same.

According to the present invention, a number of packets are sampled by using a packet sampling function provided by a packet switch chip, and the sampled packets are transmitted to a CPU. By using the transmitted sample packets, the total amount of bandwidth used by a corresponding user is estimated based on source MAC or source IP. If the estimated value exceeds a predetermined threshold, a bandwidth limitation function is applied to the user. Advantageously, a number of users can be dynamically recognized even when they are undefined, and a dynamic bandwidth limitation function is performed by tracking the bandwidth used by a corresponding user.

BRIEF DESCRIPTION OF THE DRAWINGS

The above features, and advantages of the present invention will be more apparent from the following detailed description taken in conjunction with the accompanying drawings, in which.

DETAILED DESCRIPTION

Hereinafter, an embodiment of the present invention will be described with reference to the accompanying drawings.

For the purposes of clarity and simplicity, a detailed description of known functions and configurations incorporated herein is omitted to avoid making the subject matter of the present invention unclear.

Figure 1:
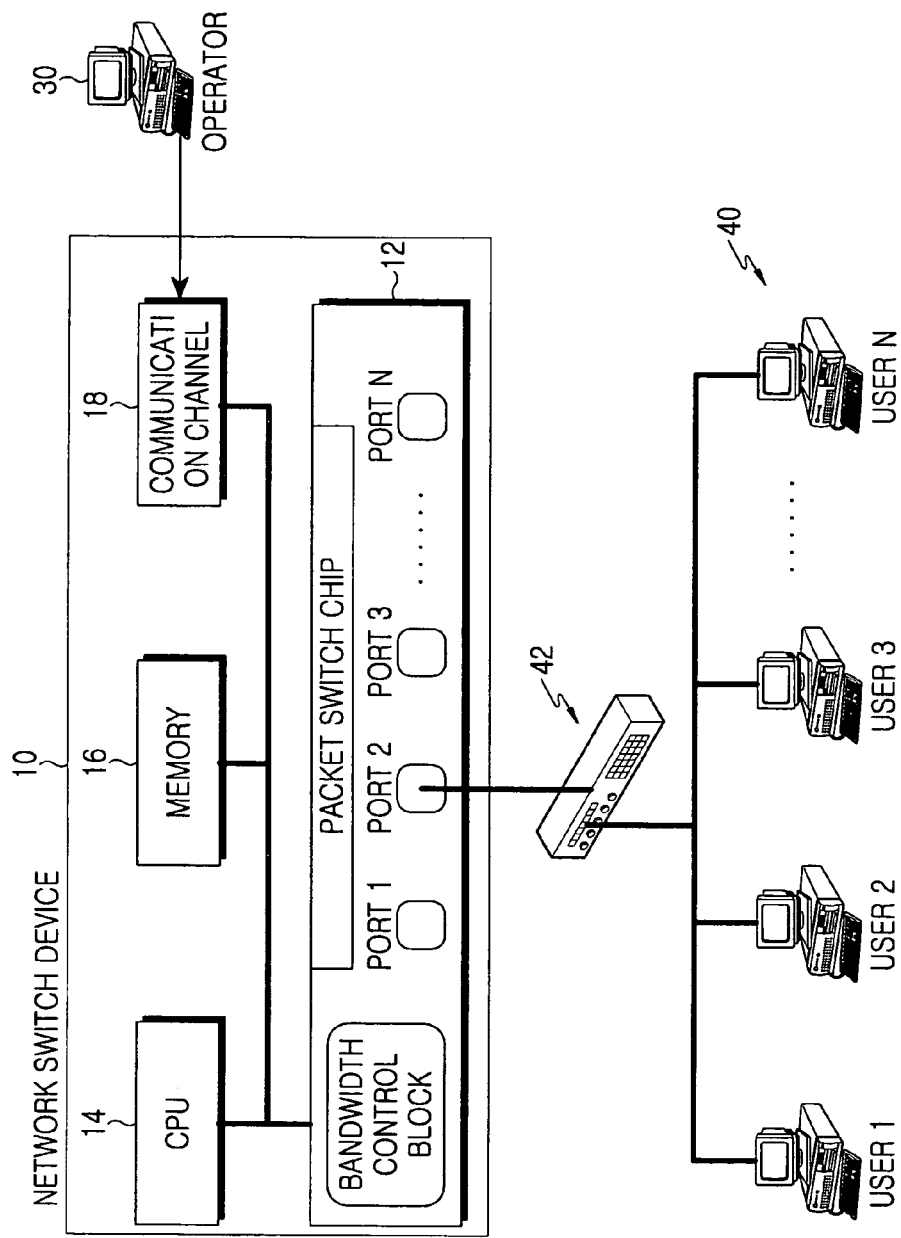
FIG. 1 is a block diagram showing the construction of a packet switch equipment according to the prior art.
Figure 2:
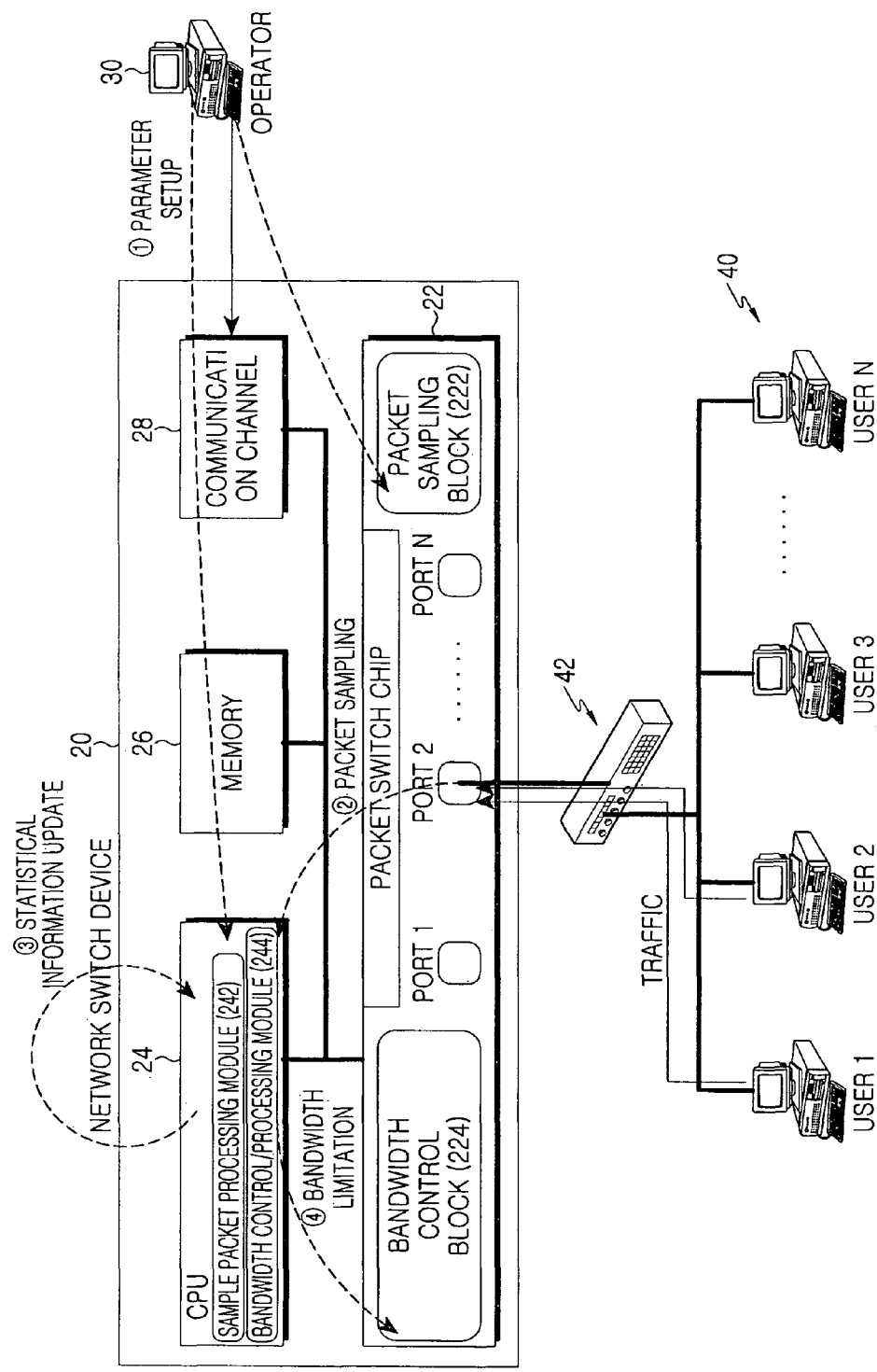
FIG. 2 is a block diagram showing the construction of a packet switch equipment according to an embodiment of the present invention.

FIG. 2 is a block diagram showing the construction of a packet switch equipment according to an embodiment of the present invention. Referring to FIG. 2, the packet switch equipment 20 includes a packet switch chip 22 having a number of ports labeled PORT 1 to PORT N, a memory 26 for storing information regarding control of packets and ports via the packet switch chip 22, a communication channel 28 for communicating with an operator terminal 30 to receive setup(s) information and parameters necessary for operation of the equipment, and a CPU 24 for controlling the overall switching operation of the Ethernet switch equipment 20 including the packet switch chip 22. In FIG. 2, the second port PORT 2 of the packet switch chip 22 is shown as being connected to a number of subscriber terminals 40 via a subscriber distribution device 42 to assist in describing the principles of the invention. However, it would be recognized by those skilled in the art that each of the ports may be connected to a number of subscriber terminals.

According to the present invention, the packet switch chip 22 employs a packet sampling function so as to sample packets according to a predetermined frequency and transmits them to the CPU 24. From the transmitted sample packets, the CPU 24 estimates the total bandwidth used by corresponding users (subscribers) based on source MAC (source IP). If the estimated value is above a threshold, the CPU 24 limits the bandwidth with regard to corresponding users (subscribers).

More particularly, the CPU 24 has a sample packet processing module 242 and a bandwidth control/processing module 244. The sample packet processing module 242 analyzes sample packets from the packet switch chip 22, classifies them according to a predetermined field (source MAC or source IP), and determines which users have sent the packets. If a new user has transmitted packets, a statistical information item for the new user is added. In the case of packets transmitted by existing users, corresponding statistical information is updated. Statistical information regarding each user is separately stored for each unit time t. The bandwidth control/processing module 244 calculates the total amount of use for the last period of time T or average PPS, based on statistical information of each user stored for each unit time. If the calculation result is above a threshold, the bandwidth control/processing module 244 sets up the bandwidth limitation function of the packet switch chip 22.

The packet switch chip 22 has a packet sampling block 222 and a bandwidth control block 224. The packet sampling block 222 is in charge of one of the functions provided by the packet switch chip 22. Particularly, the packet sampling block 222 samples packets from those entering a specific port, based on a predetermined probability, and transmits them to the CPU 24. The probability that a packet will be sampled by the packet sampling block 222 is: $p=1/N$. The bandwidth control block 224 controls another of the functions provided by the packet switch chip 22. Particularly, the bandwidth control/processing module 244 of the CPU 24 controls the operation setup of the bandwidth control block 224, which is a hardware block for limiting the amount of bandwidth used by packets entering a port according to preset conditions.

The bandwidth limitation operation of the packet switch equipment 20, based on sampling, will now be described in more detail with reference to parts of the block diagram shown in FIG. 2, which are indicated by dotted lines.

1. Parameter Setup Process

The bandwidth limitation scheme proposed by the present invention uses packets sampled according to a specific probability from packets entering the packet switch chip 22. This means that information having a high sampling frequency must be set up onto the packet switch chip 22 in advance. In general, the higher the sampling frequency is, the better. However, the higher sampling rate imposes a greater load on the CPU 24. In addition, as the sampling is independent of time, the more packets enter a specific switch port when the sampling frequency is the same, the more packets are sampled. This means that an increase in maximum bandwidth of the switch port is followed by an increase in the number of sampled packets. Therefore, the sampling frequency must be set up adequately according to the bandwidth supported by the switch port.

In addition to the sampling frequency, the following parameters must be set up in advance: maximum sampling number, packet identifier, unit time t and time period T for statistical information update, bandwidth limitation threshold, and maximum bandwidth guaranteed, which is to be used when the bandwidth limitation threshold is exceeded.

The sampling frequency means the percentage of packets to be sampled with regard to the total number of packets, i.e. the average number of packets to be sampled. The maximum sampling number means the maximum number of packets which can be sampled according to the sampling frequency when packets using the maximum bandwidth supported by the switch port have entered. Since the maximum sampling number depends on the length of packets employed, it is determined so as to conform to basic unit packets to be used for statistical information.

The packet identifier indicates which field of a packet that has been sampled and transmitted to the CPU should be used as the criterion for updating statistical information (e.g. source MAC address, source IP address).

The unit time t for statistical information update is used as a basis for updating the statistical information of each user and storing it as a separate element. The period time T for a final statistical average (T=nt) means the period of time during which statistical information obtained for each unit time t is maintained inside a system. Particularly, the period time T serves as a basis for obtaining an average of packets sampled for the last period of time T from statistical information stored for each unit time t.

When the average of sampled packets exceeds the bandwidth limitation threshold, the bandwidth limitation function is applied to the switch chip. The guaranteed maximum bandwidth is applied to the packet switch chip 22 when the bandwidth limitation threshold is exceeded.

These parameters may be set up in advance when the operator inputs suitable values via the operator terminal 30. Alternatively, at least a part of the parameters may be predetermined and setup by default. The meaning of the parameters and operations based on them will become clearer from the following description.

2. Packet Sampling Process

After basic parameters are set up in the above process, all incoming packets are sampled according to the sampling frequency determined in the above process and the sampled packets are transmitted to the CPU 24. The sampled packets are used by the sample packet processing module 242 to update statistical information according to the packet identifier (i.e. user). If no source information regarding a packet exists within the system, statistical material information for a new source information is created. Such processing will be described in more detail with reference to FIG. 3.

3. Statistical Information Update Process

Figure 3:
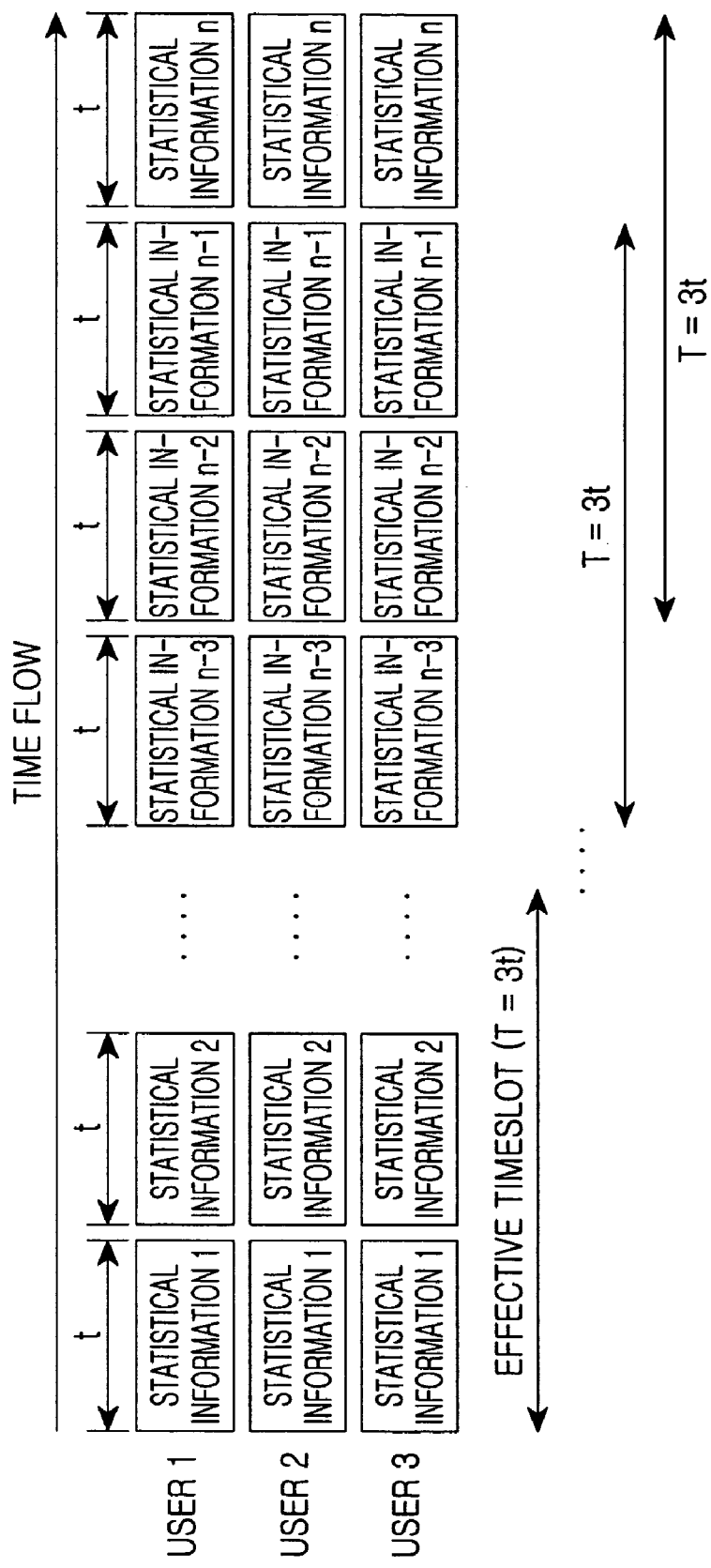
FIG. 3 shows statistical information calculation and update time while the bandwidth of a packet switch equipment is controlled according to an embodiment of the present invention.

The sample packet processing module 242 performs statistical information update for each time t (unit time for statistical information update). The sample packet processing module 242 stores statistical information which has been updated for each user and calculates average statistical information from pieces of statistical information stored within the last period of time T. FIG. 3 shows that the currently stored statistical information is $n^{th}$ information, and T=3 t. In this case, $(n-2)^{th}$, $(n-1)^{th}$, and $n^{th}$ (current) stored statistical information are used to calculated the average statistical information. A memory space is created so as to store statistical information regarding packets arriving from the current time to a next time t, and a timer is set up so that a statistical information update module is run at the next time t.

4. Bandwidth Limitation Process

The average statistical information of all sources calculated in the above process are checked so as to determine if there is a source (i.e. user) exceeding the bandwidth limitation threshold. If so, the bandwidth control block 224 sets up the switch chip so that the corresponding source (user) does not exceed the guaranteed maximum bandwidth.

Figure 4:
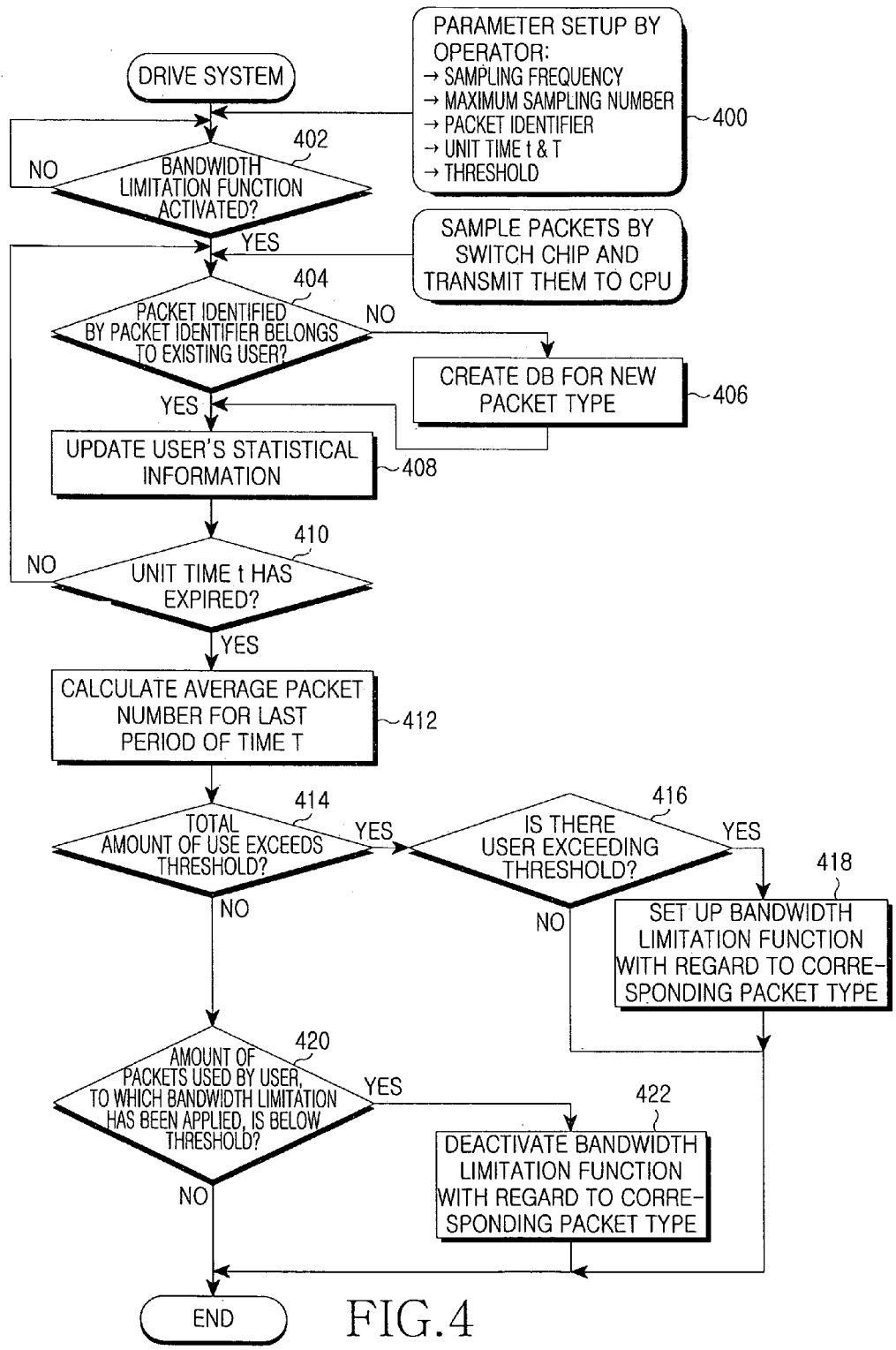
FIG. 4 is a flowchart showing a method for controlling the bandwidth of a packet switch equipment according to an embodiment of the present invention.

FIG. 4 is a flowchart showing an exemplary method for controlling the bandwidth of a packet switch equipment according to an embodiment of the present invention. The method will now be described with reference to control operations of the CPU 24 shown in FIG. 2. Referring to FIG. 4, the CPU 24 receives input of various parameters necessary for bandwidth control. Exemplary parameters or information may be selected as sampling frequency, maximum sampling number, packet identifier, unit time t and period time T, and threshold. The parameters may be provided by an operator, or over a network are set up in step 400. The threshold may be divided into a first threshold shared by all users and a second threshold specific to each user. The operator may also determine, in advance, whether or not to activate a corresponding bandwidth limitation function. The CPU 24 checks if the bandwidth limitation function has been activated in step 402 and proceeds to step 404.

While the packet switch chip 22 samples and transmits packets, in step 404, the CPU 24 checks the packet identifier of sampled packets and determines if the packets belong to users listed in the data base (DB). If so, the CPU 24 proceeds to step 408 to update each user's statistical information, i.e. information regarding the number of employed packets, for example. Otherwise, the CPU 24 proceeds to step 406 and creates a DB for a new packet type and proceeds to step 408.

The CPU 24 checks if unit time t has expired in step 410. If not, the CPU 24 returns to step 404 and repeats the aforementioned processing steps. If unit time t has expired, the CPU 24 proceeds to step 412.

At step 412, the CPU 24 calculates the average packet number for each user for the last period of time T. The CPU 24 checks if the total amount of bandwidth usage exceeds a predetermined first threshold in step 414. If the first threshold is exceeded, the CPU 24 proceeds to step 416 and identifies those users for which the average packet number exceeds a predetermined second threshold. Then, in step 418, the CPU 24 sets up a bandwidth limitation function with regard to the packet type corresponding to identified users.

When it is confirmed in step 414 that the total amount of bandwidth usage does not exceeds the first threshold, the CPU 24 proceeds to step 420 and checks whether the amount of packets used by a user, to which bandwidth limitation has been applied, exceeds the second threshold. If so, then at step 422, the CPU 24 deactivates the bandwidth limitation function with regard to the packet type corresponding to identified users.

In summary, when the total amount of bandwidth usage does not exceed the first threshold, bandwidth limitation is not applied even when the bandwidth used by some users exceed an allowed level. When the total amount of use exceeds the first threshold, the bandwidth is limited for each identified user.

As mentioned above, the inventive packet switch equipment and the bandwidth control method using the same are advantageous in that, without predefining bandwidth setups regarding every user's packets which may enter a specific port of the packet switch chip, user information is dynamically added according to incoming packets after packet sampling so as to manage the packets' statistical information accordingly, and the bandwidth limitation function is dynamically performed based on the result. This means that the bandwidth limitation function is selectively performed according to the flow of packets. As a result, separate setups for respective users are unnecessary. Therefore, the bandwidth scheme and bandwidth limitation criterion can be easily modified and applied by simple modification of necessary parameters.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

In addition, efficient use of bandwidth is made as the bandwidth is not unconditionally limited, but is selectively limited according to the overall state of bandwidth utilization.

While the invention has been shown and described with reference to certain preferred embodiments thereof, it will may be made therein without departing from the spirit and scope of the invention as defined by the appended claims.

What is claimed is:

1. A packet switch equipment comprising:
   a packet switch chip having a number of ports so as to perform a packet switching operation, the packet switch chip sampling and outputting a number of packets according to a predetermined frequency, wherein said frequency being related to a percentage of said packets with regard to a total number of said packets;
   a communication channel for communicating with an operator terminal so as to receive setups of a number of parameters necessary for operations;
   a memory for storing information regarding control of packets and ports via the packet switch chip; and
   a CPU for controlling overall operations of the packet switch equipment, the CPU estimating a bandwidth used by each user of a packet outputted and sampled by the packet switch chip, based on a predetermined packet identifier of the packet, the CPU selectively performing a bandwidth limitation function for each user according to at least one statistical value obtained from said sampled data to achieve a maximum guaranteed bandwidth for each of said users.

2. The packet switch equipment as claimed in claim 1, wherein the CPU comprises:
a sample packet processing module for analyzing sampled packets, identifying users based on the packet identifier, and updating statistical information regarding an amount of packets used by each user for each predetermined time t and
a bandwidth control/processing module for checking an amount of packets used for a predetermined time T by using the statistical information regarding the amount of packets used by each user, the bandwidth control/processing module setting up the bandwidth limitation function when a checked value exceeds a predetermined threshold.

3. The packet switch equipment as claimed in claim 2, wherein the packet switch chip comprises:
a packet sampling block for sampling packets from packets entering each port according to a predetermined probability and outputting sampled packets to the CPU and
a bandwidth control block for controlling an amount of bandwidth used by packets entering the port under control of the bandwidth control/processing module.

4. The packet switch equipment as claimed in claim 1, wherein the packet identifier is a source MAC (Media Access Control) address or source IP (Internet Protocol) address of a corresponding packet.

5. A bandwidth control method using a packet switch equipment, the method comprising the steps of:
(a) sampling inputted packets according to a predetermined sampling frequency, wherein said frequency being related to a percentage of said packets with regard to a total number of said packets;
(b) identifying sampled packets according to a predetermined packet identifier and updating statistical information regarding an amount of use, wherein said statistical information includes at least one statistical value obtained from said sampled data to achieve a maximum guaranteed bandwidth;
(c) checking a packet identifier from the statistical information, the packet identifier exceeding a predetermined bandwidth limitation threshold, and
(d) limiting a bandwidth with regard to a packet type corresponding to a checked packet identifier.

6. The bandwidth control method as claimed in claim 5, wherein, in step (b), the statistical information is updated by separately storing the statistical information for each predetermined time t, and the statistical information stored separately is used in step (c) so as to check the packet identifier exceeding the predetermined bandwidth limitation threshold within a predetermined time T.

7. The bandwidth control method as claimed in claim 5, wherein the packet identifier is a source MAC address or source IP address of a corresponding packet.

8. A bandwidth control method using a packet switch equipment, the method comprising the steps of:
(a) sampling inputted packets according to a predetermined sampling frequency, wherein said frequency being related to a percentage of said packets with regard to a total number of packets;
(b) identifying sampled packets according to a predetermined packet identifier and updating statistical information regarding an amount of use;
(c) checking if a total amount of use exceeds a predetermined first threshold by using the statistical information;
(d) checking a packet identifier from the statistical information, the packet identifier exceeding a predetermined second threshold, when the total amount of use exceeds the first threshold; and
(e) limiting a bandwidth to achieve a guaranteed maximum bandwidth based on at least one statistical value with regard to a packet type corresponding to a checked packet identifier.

9. The bandwidth control method as claimed in claim 8, further comprising a step of deactivating a bandwidth limitation function when the total amount of use is below the first threshold.

10. The bandwidth control method as claimed in claim 8, wherein, in step (b), the statistical information is updated by separately storing the statistical information for each predetermined time t, and the statistical information stored separately is used in step (d) so as to check the packet identifier exceeding the second threshold within a predetermined time T.

11. A computer program-product stored on a non-transitory computer readable media providing computer instruction to a computer system, said instruction when accessed by the computer system causing the computer system to execute the steps of:
(a) sampling inputted packets according to a predetermined sampling frequency wherein said frequency being related to a percentage of said packets with regard to a total number of packets;
(b) identifying sampled packets according to a predetermined packet identifier and updating statistical information regarding an amount of use;
(c) checking a packet identifier from the statistical information, the packet identifier exceeding a predetermined bandwidth limitation threshold, and
(d) limiting a bandwidth to achieve a guaranteed maximum bandwidth based on at least one statistical value with regard to a packet type corresponding to a checked packet identifier.

12. The product as recited in claim 11, wherein the statistical information is updated by separately storing the statistical information for each predetermined time t, and the statistical information stored separately is used to check the packet identifier exceeding the predetermined bandwidth limitation threshold within a predetermined time T.

13. An apparatus for performing bandwidth control in a packet switch network, the apparatus comprising:
a processor in communication with a memory, the processor executing computer code causing the processor to execute the steps of:
(a) sampling inputted packets according to a predetermined sampling frequency, wherein said frequency being related to a percentage of said packets with regard to a total number of packets;
(b) identifying sampled packets according to a predetermined packet identifier and updating statistical information regarding an amount of use;
(c) checking if a total amount of use exceeds a predetermined first threshold by using the statistical information;
(d) checking a packet identifier from the statistical information, the packet identifier exceeding a predetermined second threshold, when the total amount of use exceeds the first threshold; and
(e) limiting a bandwidth to achieve a guaranteed maximum bandwidth based on at least one statistical value with regard to a packet type corresponding to a checked packet identifier.

14. The device as claimed in claim 13, further comprising a step of:

deactivating a bandwidth limitation function when the total amount of bandwidth use is below the first threshold.

15. The device as claimed in claim 13, wherein, in step (b), the statistical information is updated by separately storing the statistical information for each predetermined time t, and the statistical information stored separately is used in step (d) so as to check the packet identifier exceeding the second threshold within a predetermined time T.

16. The device as claimed in claim 15, wherein the packet identifier is a source MAC address or source IP address of a corresponding packet.

* * * * *

UNITED STATES PATENT AND TRADEMARK OFFICE
CERTIFICATE OF CORRECTION

| | | |
|---|---|---|
| PATENT NO. | : 7,885,258 B2 | Page 1 of 1 |
| APPLICATION NO. | : 11/637339 | |
| DATED | : February 8, 2011 | |
| INVENTOR(S) | : Min-Kyu Joo et al. | |

It is certified that error appears in the above-identified patent and that said Letters Patent is hereby corrected as shown below:

In Column 9, Claim 14, Line 1 should read as follows:
--...The APPARATUS as claimed...--

In Column 9, Claim 15, Line 5 should read as follows:
--...The APPARATUS as claimed...--

In Column 10, Claim 16, Line 4 should read as follows:
--...The APPARATUS as claimed...--

Signed and Sealed this
Tenth Day of May, 2011

David J. Kappos
*Director of the United States Patent and Trademark Office*